United States Patent [19]

Oikawa et al.

[11] 4,224,098
[45] Sep. 23, 1980

[54] APPARATUS FOR PRODUCING PAPER TUBE ASSEMBLY FOR NURSING SEEDLINGS

[75] Inventors: Shozo Oikawa; Reiji Takeda, both of Obihiro; Mamoru Sunaga, Hokkaido; Yoshiyuki Kawatsu; Michinori Sakaki, both of Obihiro, all of Japan

[73] Assignee: Nippon Tensai Seito Kabushiki Kaisha, Tokyo, Japan

[21] Appl. No.: 65,965

[22] Filed: Aug. 13, 1979

[51] Int. Cl.³ .................. B32B 31/00; A01G 9/00
[52] U.S. Cl. ............................ 156/512; 93/1 H;
   47/77; 156/578
[58] Field of Search ............ 156/512, 521, 538, 578,
   156/558, 559, 563; 93/1 H; 47/77

[56] References Cited

U.S. PATENT DOCUMENTS 3,661,682   5/1972   Shoji ........................... 156/548
3,837,263   9/1974   Kobayashi .................... 156/512

Primary Examiner—Douglas J. Drummond
Attorney, Agent, or Firm—Browdy and Neimark

[57] ABSTRACT

An apparatus for producing paper tubes assembly for nursing seedlings in which pasted, cut pieces are transferred, piled and stuck together, the apparatus includes paste supplying mean which intermittently supplying to a flattened hollow paper tube or paper tape by means of cam mechanism, suction conveyer device conveying cut pieces cut from said flattened hollow tube or said paper tape and rotary transfer means which opposed arms are radically mounted around two rotary discs respectively, non-rotary carrier table and rotary carrier table simultaneously rotate with said arm revolution are supported between edge of said opposed arms on every other one said arm, said non-rotary and rotary carrier table keep horizontal while said arms revolute.

5 Claims, 10 Drawing Figures

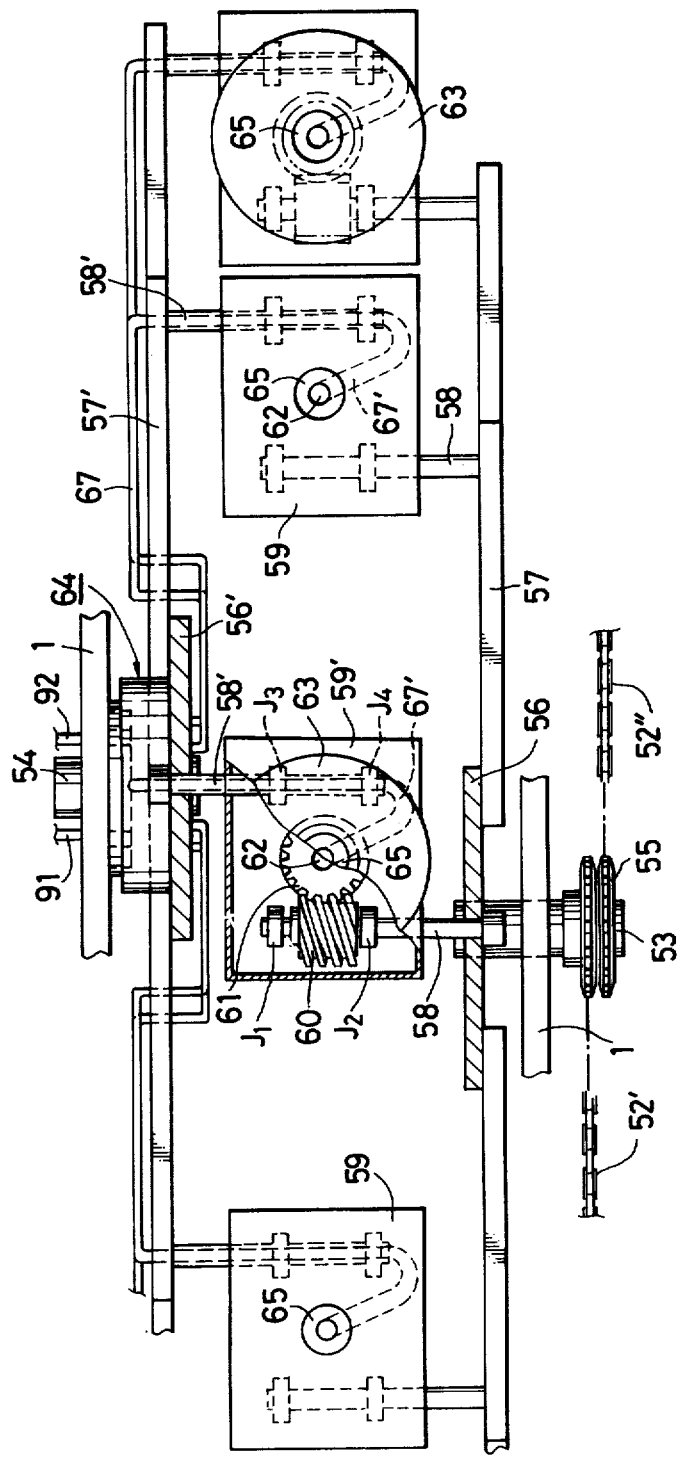

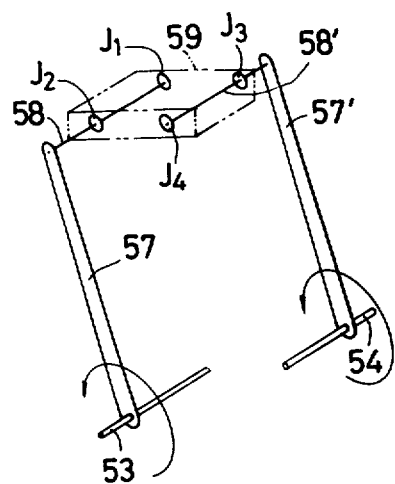
FIG. 8-a
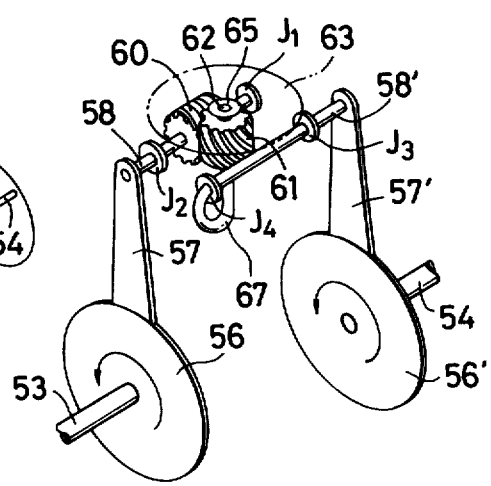
FIG. 8-b
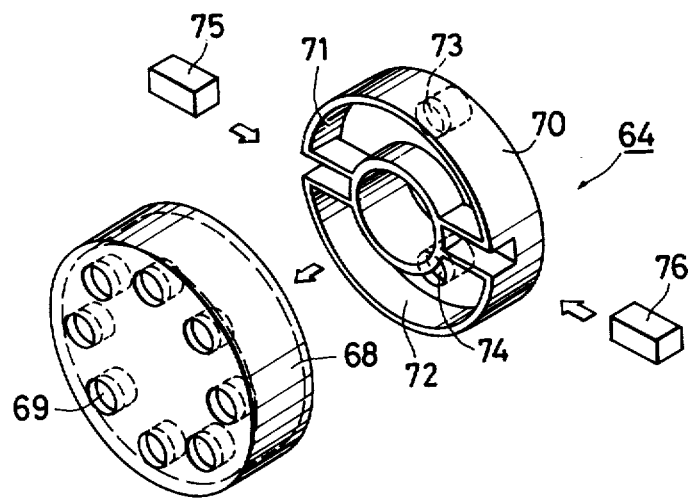
FIG. 9

APPARATUS FOR PRODUCING PAPER TUBE ASSEMBLY FOR NURSING SEEDLINGS

DETAILED EXPLANATION OF THE INVENTION

The present invention relates to an apparatus for producing paper tube assembly for nursing seedlings, each paper tube of which is square in cross section.

A square type paper tube assembly is formed by cutting a paper having a given rot-proof property into tapes of a given breadth, applying an adhesive on one side edge of the obtained tapes, joining both the sides of the tapes together to cause adhesion thereof to form a tape of flattened paper tube, applying an water-soluble paste on one side of the said flattened paper tube or applying an water-soluble paste along the center line of the tape, then cutting it into a given length of pieces and piling the pieces of a given number in layers and pasting them together into a paper tube assembly. In this case, if the flattened paper tubes are pasted together, then a paper tube assembly having double-layered partition is formed and if the tapes are applied together as they are, then a paper tube assembly having single-layered partition is formed. Relating to the method of producing such a paper tube assembly, various ways have been proposed, but relating to apparatus for producing the same, there are only disclosed in U.S. Pat. Nos. 3,661,682 and 3,837,263. These prior art apparatuses are such ones that flattened paper tubes are overlaped and pasted together by one-half of their breadth thereby obtaining a strip-like body of half-feather pattern in cross section, and this strip-like body is pasted to another similarly formed strip-like body face to face thereby forming a strip-like body having feather pattern in cross section, and thus obtained strip-like body is cut into pieces of a desired length, and a given number of these pieces are pasted together one on another. However, when produced by means of such an apparatus, since there is a slight difference in a rate of expansion and construction and in thickness between various portions of the paper, dimensional errors of said half-feather pattern strip-like bodies become accumulated in the row direction thereof, so that when the obtained paper tube assembly is developed, exact square tubes can not be formed. If these assembled paper tubes are set in a nursing flat, there may arise troubles such that the paper tubes do not become familiar to the seedling nursing flat or in the case of supplying them to a transplanting machine and carrying out the transplantation, there may arise a separation miss. Also, in the prior art apparatus, strip-like bodies formed from different papers must be pasted together and therefore a paper tube assembly is formed from differently toned papers, so that it gives a brindled pattern in appearance resulting in decreasing commercial value.

The inventors of the present invention have studied for removing said drawbacks and providing an apparatus for producing paper tubes assembly for nursing seedlings in a continuous operation, and as a result have attained this object by successively arranging means for cutting a rolled paper into tapes of a given breadth, means adapted for overlapping these tapes by one-half of their breadth to form a half-feather pattern strip-like body with or without use of a breadth-adjusting device as it is or after formed into a flattened paper tube, pasting applying means for continuously applying paste on said strip-like body corresponding to a group of cut pieces with leaving non-paste portion, means adapted to correctly transfer the strip-like body, cut into a given length and alternately reverse the cut pieces horizontally through 180 degrees angle, and means for pasting together the obtained cut pieces in piles, the above means being disposed in the above order.

Hereinafter the present invention will be explained with reference to the accompanying drawings.

BRIEF EXPLANATION OF DRAWING

FIG. 7 is a plan view of the direction reversing device;

FIG. 8a and 8b are explanatory viws of the reversing device; and

FIG. 9 is an explanatory view of the vacuum-pressure distributor.

Figure 1:
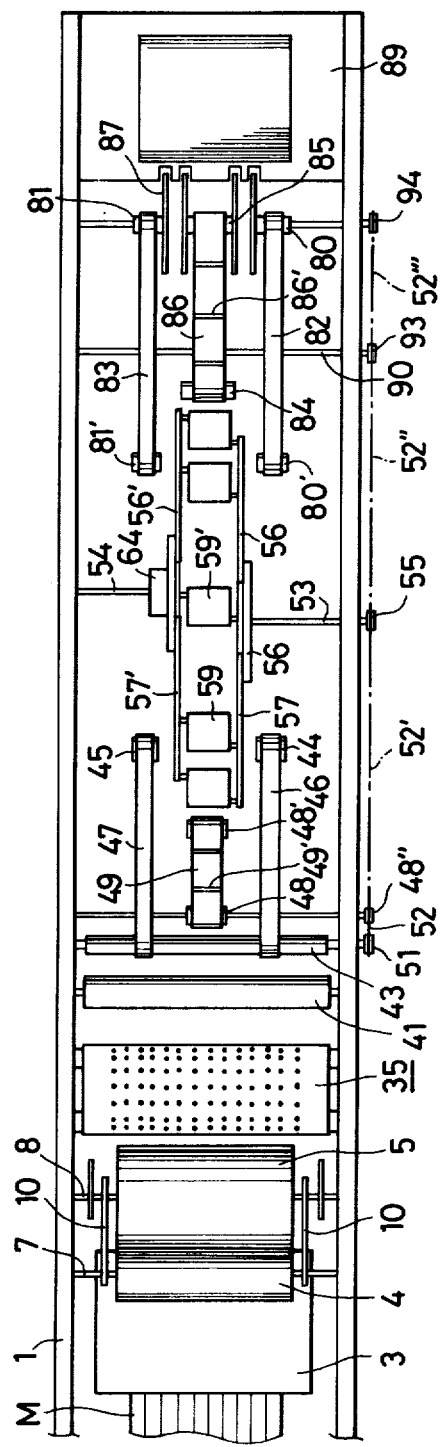
FIG. 1 is a plan view of the apparatus according to the present invention.
Figure 2:
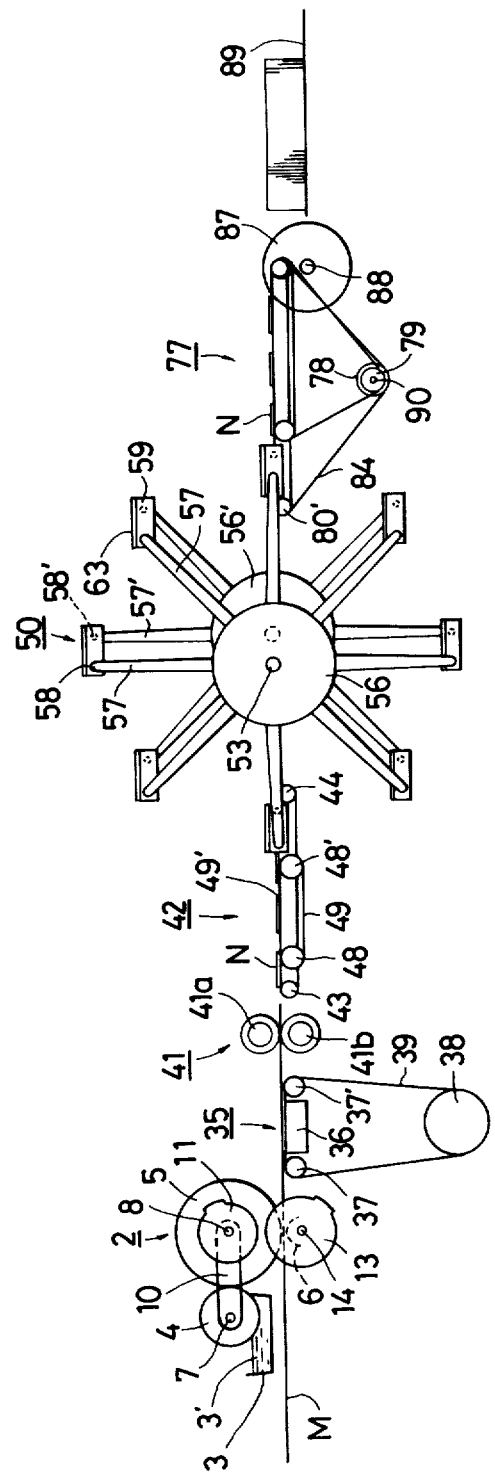
FIG. 2 is a side view of said apparatus.
Figure 3:
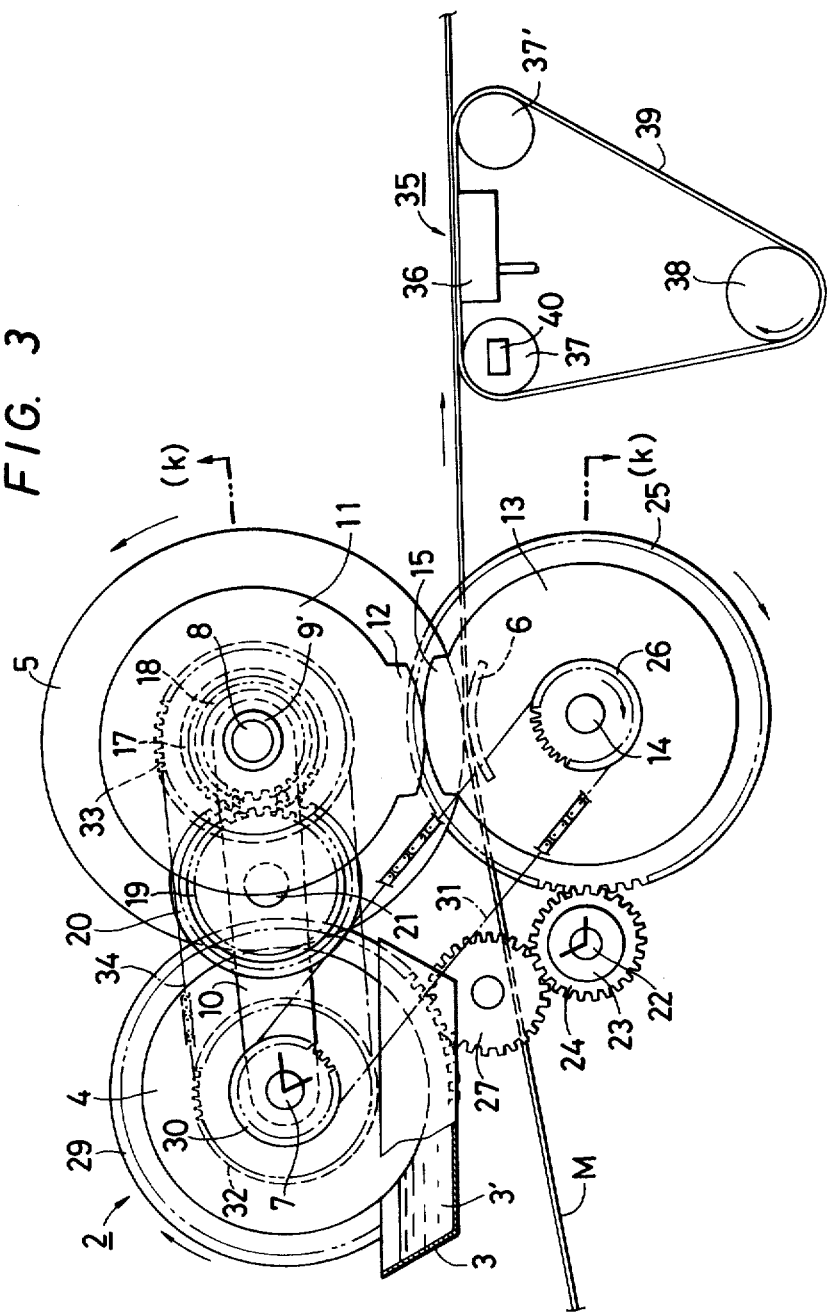
FIG. 3 is a side view of the paste applying device.

In the drawings, M is a half-feather pattern strip-like body, which is the same as that described in U.S. Pat. No. 3,661,682 and formed by flattening tape-like paper tubes and pasted them together by a half of their transverse breadth. 1 is a machine frame, 2 is a paste applying device mounted on the machine frame 1, which paste applying device comprises a paste dish 3, a paste transfer roll 4, a pasting roll 5, and a pressing body 6, and the paste transfer roll 4 is a plain roll and transfers paste 3' within the paste dish 3 to the pasting roll 5, and the pasting roll 5 is formed by a light material such as light metal or synthetic resin, which have a great number of ridge lines transversely on the surface and rotates in the arrow direction. The pressing body 6 is placed opposite to the lower portion of the pasting roll 5 and extended between the machine frames 1, 1 and has an arc shape in cross section, and a strip-like body M is passed through between said pasting roll 5 and the pressing body 6 thereby continuously applying paste lines to the strip-like body M. In the subsequent steps, the strip-like body M applied with the paste lines is cut into pieces of a given length, and a certain number of these cut pieces N are piled up and pasted together under pressure to form a group unit of the said assembly product, and in the above application of the paste lines to the strip-like body M, the paste lines are continuously applied to the strip-like body M only over a length section corresponding to the cut pieces N required to form said one group unit of the product, and immediately thereafter there is formed a non-paste section corresponding to one of the cut piece N, and thereby a continuous production of the paper tube product as one group unit is enabled successfully. To attain this, the pasting applying device 2 is provided with a paste application preventing mechanism which slightly lifts the pasting roll 5 apart from the strip-like body M each time the pasting roll 5 causes a given rotation as described hereinafter.

Figure 4:
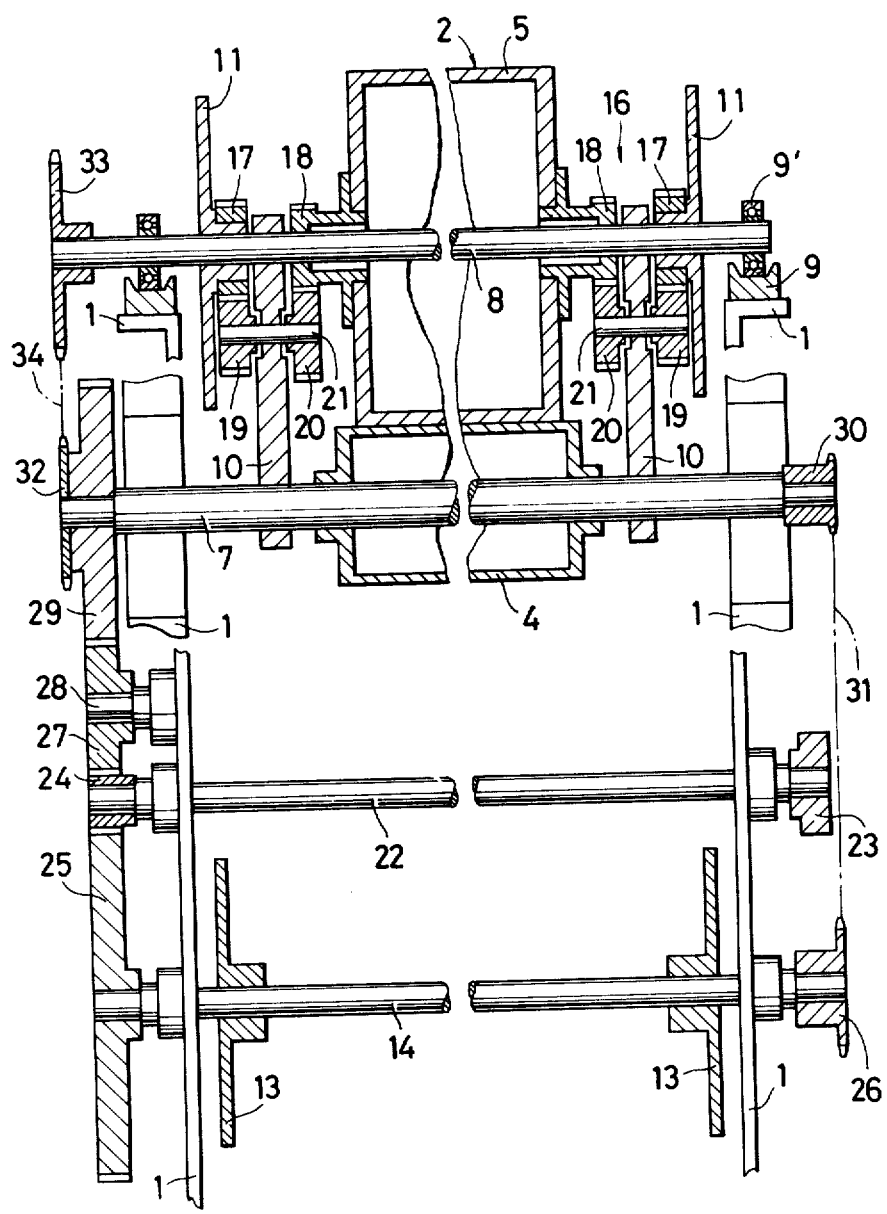
FIG. 4 is a developed sectional view taken along the line K—K of FIG. 3.
Figure 5:
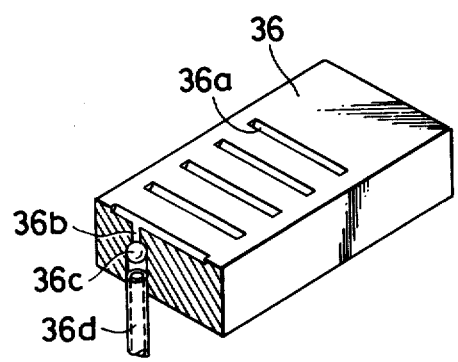
FIG. 5 is an explanatory view of the suction table.
Figure 6:
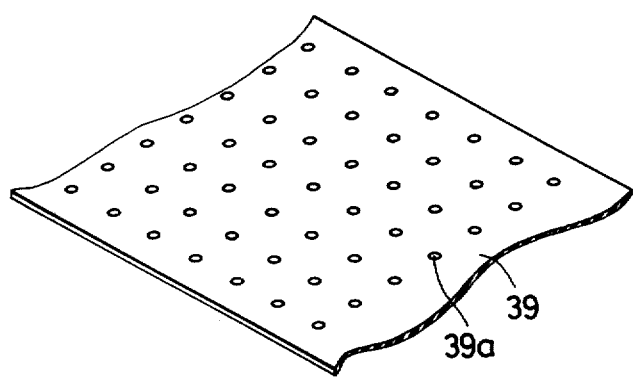
FIG. 6 is a partial perspective view of the endless belt.

Namely, a paste transfer roll 4 is fixedly mounted on a paste transfer roll shaft 7 rotatably supported on the machine frame 1, and on the other hand as shown in FIG. 4, the pasting roll 5 is loosely fitted on the pasting roll shaft 8 supported both sides thereof through bearings 9', 9' putting onto upward open bearing blocks 9,9 on the machine flame 1,1. On both sides of the paste transfer roll shaft 7, arms 10,10 are freely inserted at their one ends, and at their other ends the pasting roll shaft 8 is freely inserted, so that the pasting roll 5 can be lifted about the shaft 7 as a fulcrum.

11,11 are first cams, which are fixed on both sides of the roll shaft 8 respectively so as to rotate with the shaft 8 in a body. 12 shows the projecting portion of the cam 11. 13,13 show second cams which are mounted rotatably between the machine frames 1,1 so as to engage respectively with the first cams 11,11 associated therewith, and fixed on the both sides of the cam shaft 14. 15 is the projecting portion of the second cams 13, which is adapted so slightly push up the shaft 8 and lift the pasting roll 5 from the pressing body 6 only when engaged with the projecting portion 12. 16 is a speed change mechanism between pasting roll 5 and cums 11 comprising a set of gears 17, 18, 19, and 20. The gear 17 is fixed on the boss portion of the first cams 11 fixed on the pasting roll shaft 8 and thus rotated in the arrow direction with the cams 11 in a body. The gears 18 are inserted on the shaft 8 and fixed to the sides of the pasting roll 5 and thus rotated with the pasting roll 5 in a body. The gears 19 are fixed on intermediate shaft 21 so as to engage with the gears 17 respectively, said intermediate shafts 21 being freely inserted in the arms 10, and similarly the gears 20 are fixedly mounted on the intermediate shafts 21 on the other side so as to engage with the gears 18 respectively, whereby the gears 19 and 20 are rotated through the intermediate shafts 21 in a body. 22 is a drive shaft located below the shaft 7 and rotatably mounted on the machine frame 1, which drive shaft has an input gear 23 fixed at its one end and a transmission gear 24 fixed at the other end. 25 is a gear fixed on one end of the cam shaft 14 in engagement with the transmission gear 24, and 26 is a sprocket similarly fixed on the other end of the shaft 14, and 27 is a gear rotatably fixed on a short shaft 28 fixed on the machine frame 1, which gear is in engagement with the transmission gear 24. 29 is a gear rotatably mounted on the roll shaft 7 in engagement with the gear 27 on one side of the pasting roll shaft 7, these being respectively engaged each other for rotation. 30 is a sprocket fixed on the other side of the shaft 7, and between the sprockets 26 and 30 is stretched a chain 31. 32 and 33 are sprockets, and the sprocket 32 is inserted on the shaft 7 and fixed on the side of the gear 29 so as to rotate with the gear 29. The sprocket 33 is fixed on one side of the shaft 8, and between the sprockets 32 and 33 is stretched a chain 34.

In the above arrangement, if an input operatively connected to a cutting device hereinafter explained is supplied to the input gear 23 the transmission gear 24 on the other side rotates via the shaft 22 thereby driving the gears 25, 27 engaged with the gear 24. The gear 29 and the sprocket 32 rotate in a body, so that a rotary force is transmitted to the sprocket 33 through the chain 34 to rotate the shaft 8. Due to the rotation of the shaft 8 the first cams 11 and the gears 17 rotate in a body, and this rotation is transmitted to the gears 19,20 and 18 thereby causing the rotation of the pasting roll 5.

On the other hand, through the gear 25 is rotated by engagement with the transmission gear 24 the second cams 13 fixed on the shaft 14, and thus sprocket 26 are also rotated.

The rotation of the sprocket 26 rotates the shaft 7 via the sprocket 30, thereby rotating the paste transfer roll 4 mounted on the same shaft. In such a way, the first and second cams are separately rotated at different rotational speeds, and when the projecting portions 12 and 15 are brought into engagement, the shaft 8 is lifted up by the arms 10 about the shaft 7 as a fulcrum. In this case, assuming that a is the number of cut pieces N which can be pasted by one rotation of the pasting roll 5 and Xo is the rotational number of the pasting roll 5, the number Y of the cut pieces N to be pasted by X rotations of the pasting roll 5 is given by the following formula:

$$Y = a \cdot X_o \ldots \quad (I)$$

Since the rotation of the pasting roll 5 is transmitted through the speed change mechanism 16, now assuming that $X_1$ is the rotation of the first cams 11, and the numbers of teeth of the gears are respectively A (17), D (18), B (19) and C (20), the ratio of number R between these gears is $R = (A \cdot C)/B \cdot D)$, the rotation Xo of the pasting roll 5 resulting from the rotation $X_1$ of the first cams 11 is given by the following formula:

$$X_o = X_1 \cdot R \ldots \quad (II)$$

Accordingly, from the above formulas (I), (II) the numbers of teeth A, B, C and D can be determined, so that the pasting roll 5 and the first cams 1 can be rotated at a desired ratio of rotation.

In the above example, the explanation is done in relation to the speed change mechanism by means of gears, but it is possible to use a mechanical or electrical stepless speed change mechanism instead of a set of gears.

Relative to the first cams 11 thus rotated, the rotation $X_2$ of the second cam 13 rotated corresponding to said first cams 11 is selected so as to meet the formula $X_2 = X_1 \pm 1$, so that the projections 12 and 15 of both the cams abut together each time the first cams 11 rotate by $X_1$ rotations and the second cams 13 rotate by $X_2$ rotations, thereby lifting the pasting roll shaft 8. In this case, the arc length of the projecting portions 12 and 15 of the first and second cams is selected so as to correspond to the peripheral face length of one cut piece N of the attaching face of the pasting roll 5, so that the pasting along the section of the length of the one cut piece can be avoided. Practically, an allowable maximum rotational number of the rotation $X_1$ of the first cam 11 is a value of an integer portion of the product of the number of cut pieces a and the ratio of tooth number R between said gears by the limitation of the interference of the cam projections 12 and 15, and the number Y of cut pieces N obtained from said formula (I) and (II) can be freely selected in the range of $X_1 < a \cdot R$ in formula $Y = a \cdot X_1 \cdot R$. With respect to this, in the prior art device, both the first cam 11 and the pasting roll 5 are fixed to the pasting roll shaft 8, and therefore assuming that T is the number of projection of cam, the maximum rotational number which is able to be taken by $X_o = X_1$ becomes a/T by the limitation of the interference of the projections, so that the rotational numbers $X_o$, $X_1$ are determined by $X_o < a/T$ and $Y = a \cdot X_o$, and thus subjected to a remarkable limitation compared with the apparatus of the present invention.

Next, there is provided with a suction conveyor device for transferring said strip-like body M to a cutting device, and said strip-like body M is applied with paste under tension such that the nonpaste sections are formed more effectively. The suction conveyor device 35 comprises a suction table 36, guide rolls 37, 37', a drive roll 38, and an endless belt 39 stretched therebetween. The suction table 36 is a plate-like body having a flat or arc-shaped surface which is placed adjacent below the strip-like body M, and the upper surface of said plate-like body has a plurality of groove-like suction ports 36a formed therein, said suction ports being parallel to or perpendicular to the progress direction of the strip-like body M, and one side of a communicating hole 36b opens to the bottom portion of the suction port 36a, and the other side thereof opens to an air collecting hole 36c provided in the suction table 36. 36d is an exhaust pipe, one end of which communicates with the air collecting hole 36c and the other side communicates with a suction device (not shown). The endless belt 39 is stretched between the guide rolls 37, 37' and the drive roll 38, and a number of draft hole 39a corresponding to the suction ports 36a are formed therethrough. As the endless belt 39 any construction may be used which has a similar function as the above provided with such draft holes 39a, and for example it is possible to use a net body formed from a material having an adequate strength and abrasion resisting property. The drive roll 38 rotates by an input corresponding to the feed velocity of the strip-like body M, and the linear velocity of the endless belt 39 is slightly larger than the running linear velocity of the strip-like body M so that the strip-like body M is pulled. 40 is a belt-tension adjusting device in which guide rolls 37 are movably mounted on the left and right to adjust the tension of the belt 39. In such an arrangement, the strip-like body M on the endless belt 39 is attracted to the suction table 36 as it is supplied forwards.

The supplied strip-like body M is cut into pieces of a given length by means of rolls 41a, 41b of a rotary type cutter 41. 42 is a transfer device for further transfer the cut pieces N, which device comprises a pair of transfer belts 46, 47 which are stretched between a drive roll 43 and follower rolls 44, 45 mounted on the machine frame 1 with an interval narrower than the cut piece N, a supply belt 40 stretched between a drive roll mounted between said belts 46, 47 and a follower roller 48', and projections 49' attached on said belt 49, thereby receiving and transferring said cut pieces N. The belts 46, 47 have a faster velocity than that of the belt 49, so that the projections 49' always bear against the cut pieces N for the transfer. The transferred cut pieces N are directionally reversed for every other piece by means of a direction reversing device 50. This direction reversing device 50 is operatably connected with the roll 41b through sprocket wheels 51, 48" of the rolls 43, 48, chains 52, 52' and sprocket wheel 55 and has a three-joint linkage construction. Namely, as shown in FIGS. 7 and 8, a shaft 53 supported on one side of the machine frame 1 perpendicularly thereto and a shaft 54 supported on the other side are mounted on the same horizontal plane with their axes offset each other, and a sprocket wheel 55 is fixed on the shaft 53 and a chain 52' is stretched between said sprocket wheels 55 and 48' for the drive. On the shafts 53 and 54 rotary discs 56 and 56' are respectively fixed vertically opposite to each other with an interval between the discs narrower than that between said belts 46 and 47. The rotary discs 56 and 56' are respectively provided with a number of pairs of opposed arms 57 and 57' and at the ends of said arms pairs of shafts 58 and hollow shafts 58' are mounted perpendicularly inward such that the shafts 58 are fixed and said shafts 58 and 58' are arranged parallel each other, and the locus of rotation of said hollow shafts lies between said belts 46 and 47. In this case, between the shafts 58, 58' of pair of odd number order a carrier table 59 for the cut piece N is bridged and bearings $J_1-J_4$ are fixed on the inside of said table, and rotatably mounted on the shafts 58, 58'. Thus it is communicated via a pipe 67' with a hollow shaft 62 which passes vertically through the end portion of the shaft 58' and the center of the non-rotary carrier table 59, and opens to its upper face at opening 65. On the other hand, on the shafts 58, 58' of pair of even number order, instead of said carrier table 59, a gear box 59' is mounted similarly to the above, and at the center portion of the shaft 58 a gear 60 is fixed, and the gear box 59' accommodates a gear 61 mounted vertically therein such that this gear 61 meshes with said gear 60 at right angles each other. The shaft 62 of the gear 61 is hollow, and extends upward through the gear box 59' and fixes the center of a rotary carrier table 62 slidably contacting with the upper face of the gear box 59' and opens at the upper face at opening 65. The ratio of rotation of gear 60 and 61 is 1:1. Accordingly, when said rotary disc 56 is driven by the chain 52', the arm 57 and the shaft 58 rotate and the carrier table 59 and the gear box 59' pull the shaft 58', so that the arm 57' rotates.

In this case, the shafts 53 and 54 of the rotary discs 56 and 56' have axes offset from each other so that a three-joint linkage is formed, and thereby the carrier table 59, the gear box 59' and the rotary carrier table 63 rotate while maintaining their horizontal postures. Also, since the shaft 58 at the even number order has the gear 60 fixed thereon, the gears 60, 61 are caused to rotate once for every one rotation of the rotary disc 56, and thereby the rotary carrier table 63 is rotated once correctly.

In order to transfer the cut piece N positively during said rotation, outside the rotary disc 56' a vacuum-pressure distributor 64 is mounted in close contact therewith. The distributor 64 is shown in FIG. 9 in detail, in which a manifold 68 is fixed to the rotary disc 56' and has the same number of through holes 69 as the arms 57', and said manifold communicates with openings 65 of the carrier table 59 and the rotary carrier table 63 through a pipe 67, a hollow shaft 58' and the pipe 67'. Moreover, in the manifold is fitted a distributing valve 70 which is fixed on the machine frame 1. Said distributing valve 70 is centrally divided into upper and lower arc-shaped space chambers 71 and 72, which have respectively a through hole 73 and 74, and the hole 73 communicates with an suction pipe 91, and the hole 74 with a compressed air supply pipe 92. Between the central division slide faces are inserted separating pieces 75, 76, and the distributing valve 70 and the manifold 68 are adapted to rotate relative to each other in sliding contact with their contacting faces so as to maintain airtight against the outside. As a result, with rotation of the face having through holes 69 formed in the manifold 68 the suction and exhaust are successively repeated and in turn the opening 65 of the carrier table 59 and the rotary carrier table 63 communicating with said through holes 69 also repeat the suction and exhaust. Accordingly, the cut piece N is attracted to the carrier table 59 and the rotary carrier table 63 under the suction condition, so that it is positively transferred without causing any lateral shift etc. When the direction reversing device 50 turns and reaches the opposite side which is 180 degrees angle opposite to the receiving side, the openings 65 of the carrier table 59 and the rotary carrier table 63 communicate with a compressed air supply pipe 92 and is freed from the suction and it is provided to the side of the sticking device 77. On the other hand, the sticking device 77 comprises feed belts 82, 83 mounted on both sides of the rotary path of the carrier table 59 in the same horizontal plane as said belts 46, 47, rolls 80, 80', 81 and 81' for supporting said belts 82, 83, an alignment belt 86 between the drive roll 78 and the feed belts 82, 83, a drive pulley 79 for the belt 86 and a follower pulleys 84, 85. The drive pulley 79 and the drive roll 78 are fixed on a shaft 90 both ends of which are freely inserted in the machine frame 1, and on the shaft 90 is fixed a sprocket wheel 93 which is operatively connected with said sprocket 55 through a chain 52''. The diameter of the drive pulley 79 is smaller than the drive roll 78, so that the feed belts 82, 83 rotate faster than the alignment belt 86. 86' is a projection provided on the belt 86. On the shaft 88 is fixed a serrated pressing wheel 87 and a sprocket 94 which is operatively connected with the sprocket 93 through a chain 52'', and on the opposite side of the belt 86 which feeds the cut piece N to the wheel 87 a cut piece aligning table 89 is fixed to the machine frame 1, and the pressing wheels 87 are allowed to be inserted in the front end of the aligning table. The cut pieces N on the carrier tables 59 and the rotary carrier table 63 are received by the belts 82, 83 at their left and right extended portions, and then fed onto the belt 86 and moved forward while bearing against the projections 86', and then inserted into the inside of the saw teeth of the serrated pressing wheel 87 and directionally turned through 90° angle, thereby arranged into the table 89. At this time, the back portion of the saw teeth of the pressing wheel 87 pushes the cut piece N so that the cut pieces N are adhered together through the pasted portions. The obtained adhered material is a feather pattern-like adhered material because the half-feather pattern-like cut pieces are arranged so that they are alternately reversed in direction. Accordingly, when this adhered material is developed, it becomes square shape, thereby ideal seedling nursing containers are continuously obtained.

As described above, the present invention is such an apparatus for producing paper tubes for nursing seedlings by continuously applying paste lines on a strip-like body and using a paste applying means which allows to provide nonpaste sections on the strip-like body at ever desired number of rotations without limitation that hitherto nonpaste sections had to be provided at every integer number of rotations of the pasting roll, and after the application of paste, continuously cutting this strip-like body and making a half-feather pattern-like cut pieces N, continuously receiving these pieces by the carrier table 59 and the rotary carrier table 63 which are alternately arranged, and during the transfer, turning the rotary carrier table 63 through 180° angle to arrange the pieces, and sticking them together by means of the sticking device 77, and therefore said direction reversing device 50 is not limited to the means using the three-joint linkage as shown in the drawing, and instead of it is possible to arrange so as to transfer the pieces on the same plane, cause a rod body mounted below the rotary carrier table to bear against a cam thereby pushing it up while turning through 180° angle, and after the turning, push it down into the same plane to again arrange them, and it is also possible to use a cam or rack for the turning of the rotary carrier table, instead of using gears.

As described above, according to the apparatus of the present invention, it is possible to produce the paper tube assembly for nursing seedlings, and also, because, in the lamination pasting of the half-feather pattern-like cut pieces, the adjacent portions of the similar paper materials are pasted together, the errors by expansion and contraction between the cut pieces are very small, so that the development accuracy of the products is improved and also it is possible to continuously produce good paper tube assembly which have almost no difference of color tone.

What is claimed is:

1. Apparatus for producing paper tube assembly for nursing seedlings comprising a paste applying device for parallel arranging tapes or tape-like flattened paper tubes of a given breadth in longitudinal direction thereof, overlapping said bodies by a desired breadth thereof and pasting them together, continuously pulling out the strip-like material formed into the form of a half-feather pattern, and carrying out the application of paste in such a way that non-paste portions of a given length are provided at given intervals on the surface; a device for continuously cutting the length of the provided non-paste portions as a unit; and a direction reversing device having rotary carrier tables and non-rotary carrier tables mounted alternately for receiving and carrying the cut pieces horizontally and adapted to rotate as a whole.

2. Apparatus for producing paper tube assembly for nursing seedlings as claimed in claim 1, wherein the paste applying device for providing non-paste portions at given intervals comprises a pair of cams rotating in opposite directions each other, one of said cams being inserted on the shaft of a pasting roll, and a speed change mechanism provided between said cam and pasting roll.

3. Apparatus for producing paper tube assembly for nursing seedlings as claimed in claim 1, wherein the direction reversing device is constructed such that a number of pairs of arms are radially fixed to a pair of rotary discs which have their axes offset from each other in the horizontal plane, and a three-joint linkage is formed by connecting the arms of the opposite pair together, and one of the non-rotary carrier tables and one of the rotary carrier tables are alternately mounted on the connecting portions.

4. Apparatus for producing paper tube assembly for nursing seedlings as claimed in claims 1 or 3, wherein the rotation of each rotary carrier table is effected by a gear fixed on a shaft mounted inside perpendicularly to the arms and a gear fixed in the rotary carrier table.

5. Apparatus for producing paper tube assembly for nursing seedlings as claimed in claim 4, wherein openings are provided at the center of each non-rotary carrier table and each rotary carrier table, and these openings are connected with a vacuum-pressure distributor associated with the rotary discs.

* * * * *